(12) United States Patent
Vernia et al.

(10) Patent No.: US 11,626,978 B2
(45) Date of Patent: Apr. 11, 2023

(54) SECURE GROUP COMMUNICATION IN A CLUSTER OF DEVICES

(71) Applicant: FIMER S.P.A., Milan (IT)

(72) Inventors: Filippo Vernia, La Spezia (IT); Luigi Lamoglie, Terranuova Bracciolini (IT); Gianluca Dini, Leghorn (IT); Mariano Basile, Taranto (IT)

(73) Assignee: Fimer S.p.A., Milan (IT)

( * ) Notice: Subject to any disclaimer, the term of this patent is extended or adjusted under 35 U.S.C. 154(b) by 56 days.

(21) Appl. No.: 17/329,600

(22) Filed: May 25, 2021

(65) Prior Publication Data
US 2021/0385077 A1    Dec. 9, 2021

(30) Foreign Application Priority Data

Jun. 5, 2020  (EP) ..................... 20178535

(51) Int. Cl.
*H04L 9/40*      (2022.01)
*H04L 9/08*      (2006.01)

(52) U.S. Cl.
CPC .......... *H04L 9/0833* (2013.01); *H04L 63/065* (2013.01); *H04L 63/0876* (2013.01)

(58) Field of Classification Search
CPC .. H04L 9/0833; H04L 63/065; H04L 63/0876
USPC ....................................... 380/278
See application file for complete search history.

(56) References Cited

U.S. PATENT DOCUMENTS

| | | | |
|---|---|---|---|
| 9,882,714 B1 | 1/2018 | Cignetti et al. | |
| 2009/0304019 A1* | 12/2009 | Chan | H04L 67/564 |
| | | | 370/432 |
| 2014/0149745 A1* | 5/2014 | Suh | H04L 9/3073 |
| | | | 713/171 |
| 2016/0006729 A1* | 1/2016 | Yang | H04W 12/0433 |
| | | | 713/156 |

FOREIGN PATENT DOCUMENTS

| | | |
|---|---|---|
| CN | 105791301 A | 7/2016 |
| WO | 2014017959 A1 | 1/2014 |

OTHER PUBLICATIONS

Zhang, "Secure Multicast for Power Grid Communications" (Year: 2010).*
European Patent Office: European Search Report dated Nov. 20, 2020, 3 pages.

* cited by examiner

*Primary Examiner* — Michael S McNally
(74) *Attorney, Agent, or Firm* — Patterson Intellectual Property Law, PC

(57) ABSTRACT

The method is aimed at providing secure multicast communication between a plurality of devices forming a cluster of devices connected to one another by a local network. The method provides for electing a key distribution device and generating a group encryption key in said key distribution device. A secure communication channel is then established between the key distribution device and each device of a group of devices to be connected to the cluster. The group encryption key is transmitted from the key distribution device to the devices to be connected to the cluster and stored thereby. When all devices of the cluster have received the group encryption key, multicast communication among the devices of the cluster can start.

20 Claims, 10 Drawing Sheets

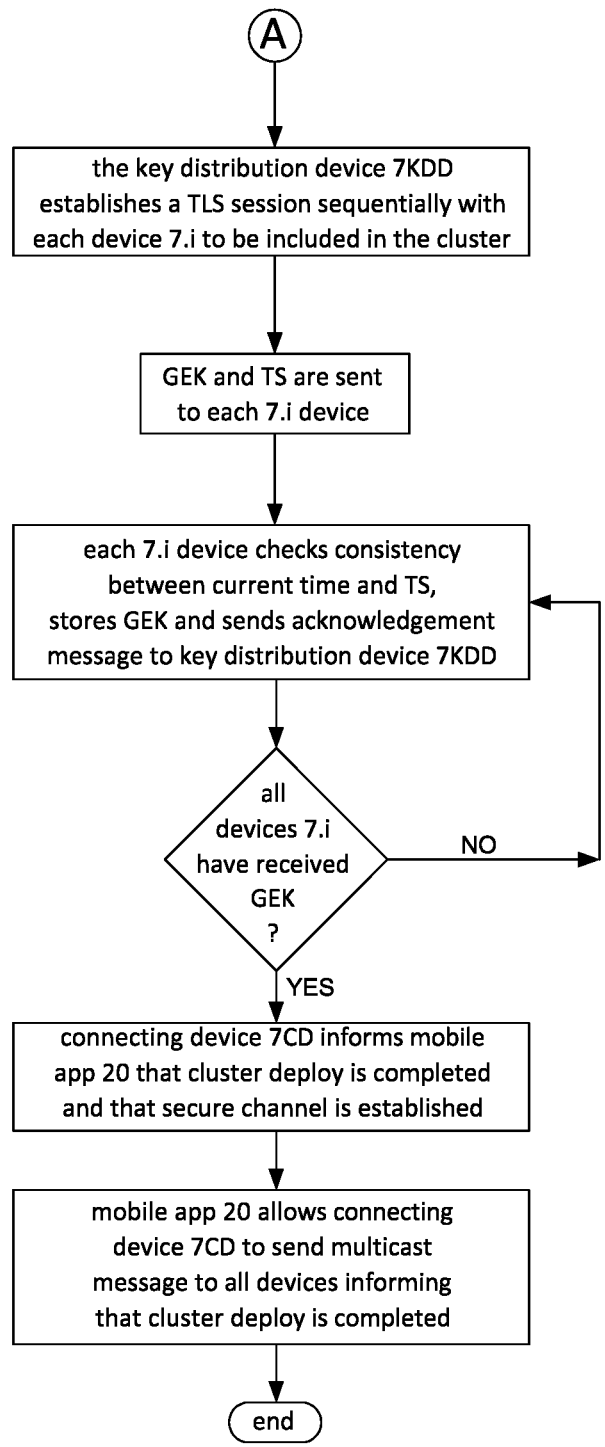
Fig.2 (cont.'d)

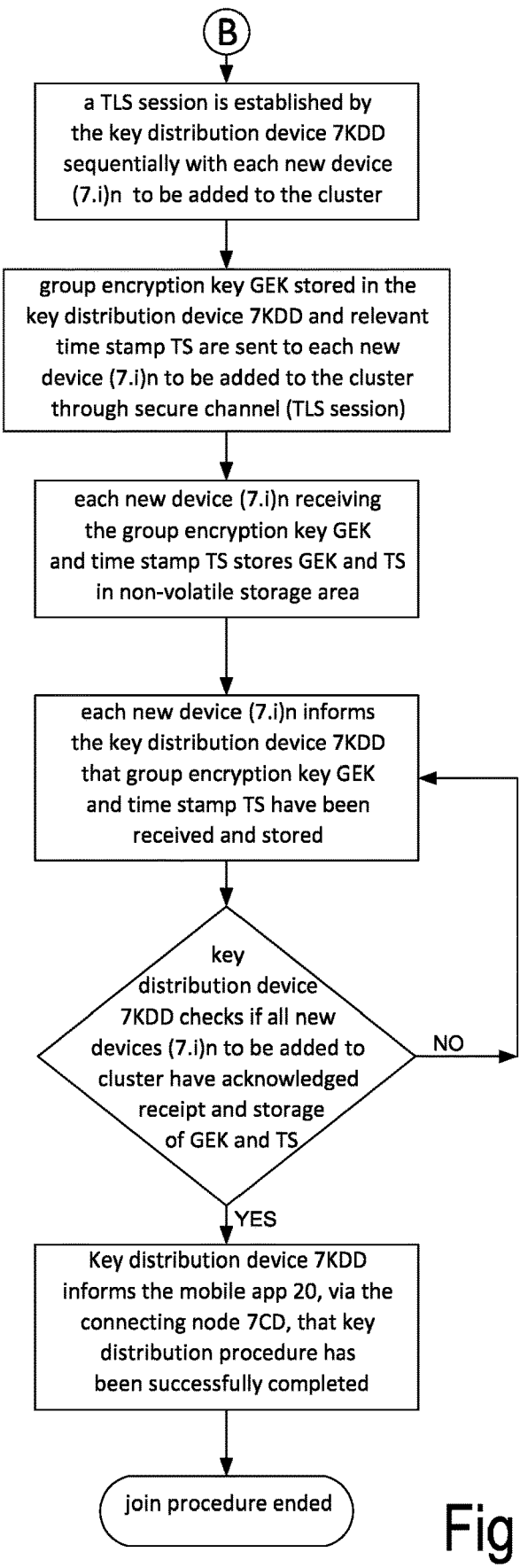
Fig.4 (cont.'d)

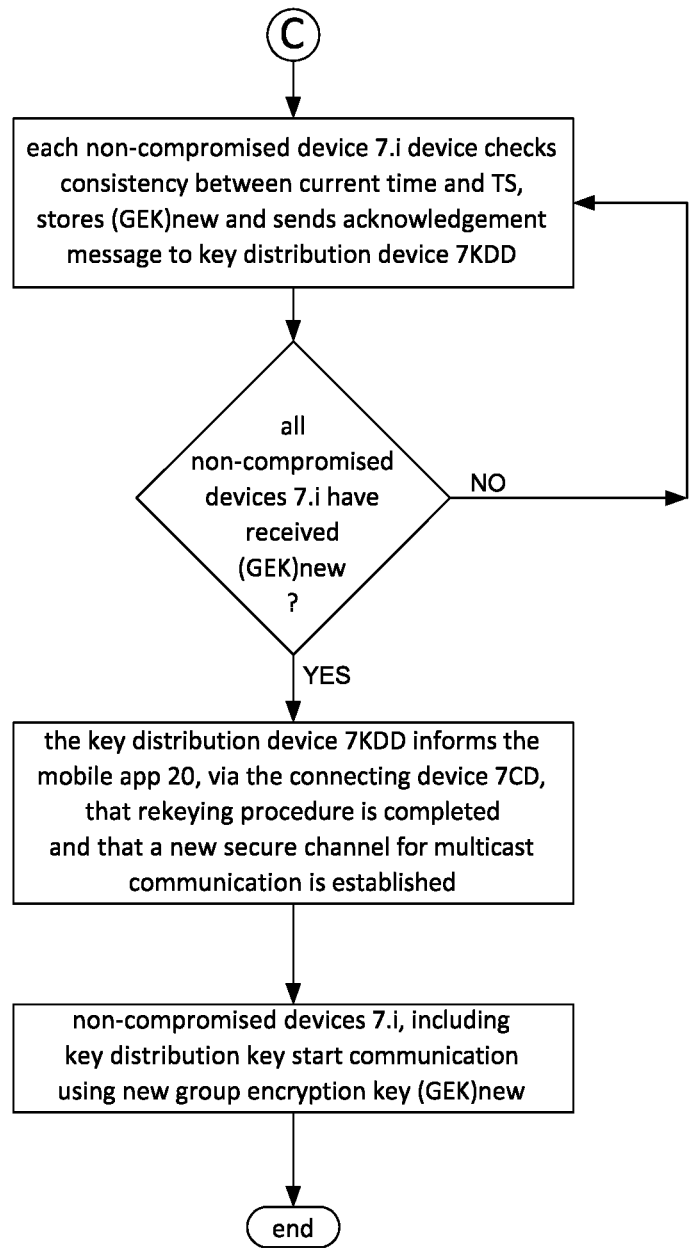
Fig.6 (cont.'d)

SECURE GROUP COMMUNICATION IN A CLUSTER OF DEVICES

TECHNICAL FIELD

The present disclosure concerns communication among multiple devices forming a cluster of devices connected to one another by a local data communication network.

Background Art

Renewable energy resources often use several inverters, connected to energy collectors, such as photovoltaic panels or wind turbines. The inverters convert electric power generated by the energy collectors into electric power suitable for exportation on an electric distribution grid.

Large photovoltaic solar plants may include several inverters, each connected to an array of photovoltaic panels. The various inverters are connected to a data communication network to exchange data packages and are further electrically connected to an electric power distribution grid, to which electric power converted by the inverters is delivered. The data communication network can be a wired network or a wireless network. Each inverter represents a node of the network. The nodes must be capable of mutually exchanging information under secure conditions. This may be a critical aspect.

Solar inverters may go down and interrupt operation for several reasons, mainly due to lack of solar radiation. An inverter, i.e. a node of the local network, may go down and come up several times a day. A node may even stay down for long periods of time, typically at night. Therefore, the nodes are not reliable by themselves and can turn off at any moment due to loss of solar radiation.

Similar issues arise in other situations where a plurality of electronic devices must exchange information with one another. For instance, inverters of wind turbines in a wind farm may face similar critical issues. Other examples are related to self-powered sensors such as pyrometers, anemometers, or the like, when the measurement takes place only in the presence of the quantity to be measured. In general, this scenario is applicable also to electric car chargers in case they need to share information to better serve the demand of energy transaction.

Communication among electronic devices belonging to a network of the type mentioned above is typically a multicast communication. Each node transmits data packages on the network to all other nodes. IP multicast by itself does not provide any mechanism for preventing devices, not belonging to the group of devices forming the network nodes, to have access to the group communication.

A need therefore exists in the art for improving communication security in multicast communication among electronic devices representing nodes of a network.

SUMMARY

The subject matter disclosed herein is aimed at providing a secure multicast communication among nodes of a local network, each node comprising an electronic device, for instance an inverter of a solar photovoltaic plant or of a wind farm. The secure multicast transmission channel shall ensure confidentiality and authenticity of communication. Confidentiality means establishing a mechanism to limit access to the data being transmitted to authorized nodes of the network only. The nodes willing to participate to the secure multicast communication are authenticated beforehand.

In order to allow anode to verify whether another node is really what it claims to be (something that it is required when establishing the secure multicast channel) each device representing a node of the network will authenticate itself by means of its own certificate. Moreover, in order to design the distributed key management protocol, the following assumptions are made:
 every node is configured with a public-private key pair. A generic node u is characterized by a public-private key pair (pubKu, privKu). It is assumed that the private key of each node is securely stored in a tamper-proof apparatus of the respective electronic device forming (part of) the node. The tamper-proof apparatus may be a trusted platform module (TPM) of a hardware-security module (HSM) or others equivalent component. The public key pubKu is certified by a certificate Certu that is stored locally to node u. It is further assumed that every node stores the certificate CertCA of the (root) Certification Authority.
 every node has a unique MAC-ADDRESS which is chosen by the suppliers of devices;
 nodes within the same cluster do not share any long-term secret;
 nodes within the same cluster synchronize their clock (f some milliseconds) by means of a Network Time Protocol (NTP) or others equivalent method;
 a firmware upgrade or configuration change has no implication on the group key stored by a node. In this sense, it is assumed that the group key being used is still available after a firmware upgrade or configuration change.

According to one aspect, disclosed herein is a method for secure multicast communication between a plurality of devices forming a cluster of devices connected to one another by a local network, wherein each device includes a storage area, a data communication unit and a data processing unit; the method comprising the following steps:
 a) electing one of said devices as a key distribution device;
 b) generating a group encryption key in said key distribution device;
 c) establishing a secure communication channel between the key distribution device and a further device of a group of devices to be connected to the cluster;
 d) transmitting the group encryption key from the key distribution device to the further device and storing the group encryption key in the storage area of the further device;
 e) repeating steps (c) and (d) for all devices in the group of devices to be connected to the cluster;
 f) when all devices of the group of devices to be connected to the cluster have received the group encryption key, starting multicast communication among the devices of the cluster; wherein data packages transmitted by each device of the cluster to the other devices of the cluster are encrypted with the group encryption key.

The method allows secure transmission of a group encryption key to a plurality of nodes or devices forming a cluster. The group encryption key is used for subsequent multicast transmission among nodes or devices of the cluster through the network.

Further embodiments and advantageous additional features of the method according to the present disclosure are described in detail hereon reference being made to the enclosed drawings, and are further set forth in the appended claims, which form an integral part of the present description.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

The following description refers specifically to photovoltaic solar plants.

However, it shall be understood that the method disclosed herein can be used in different systems where similar requirements are present, i.e. whenever there is a need for a secure multicast transmission among devices of a cluster, connected to one another by a local network.

Figure 1:
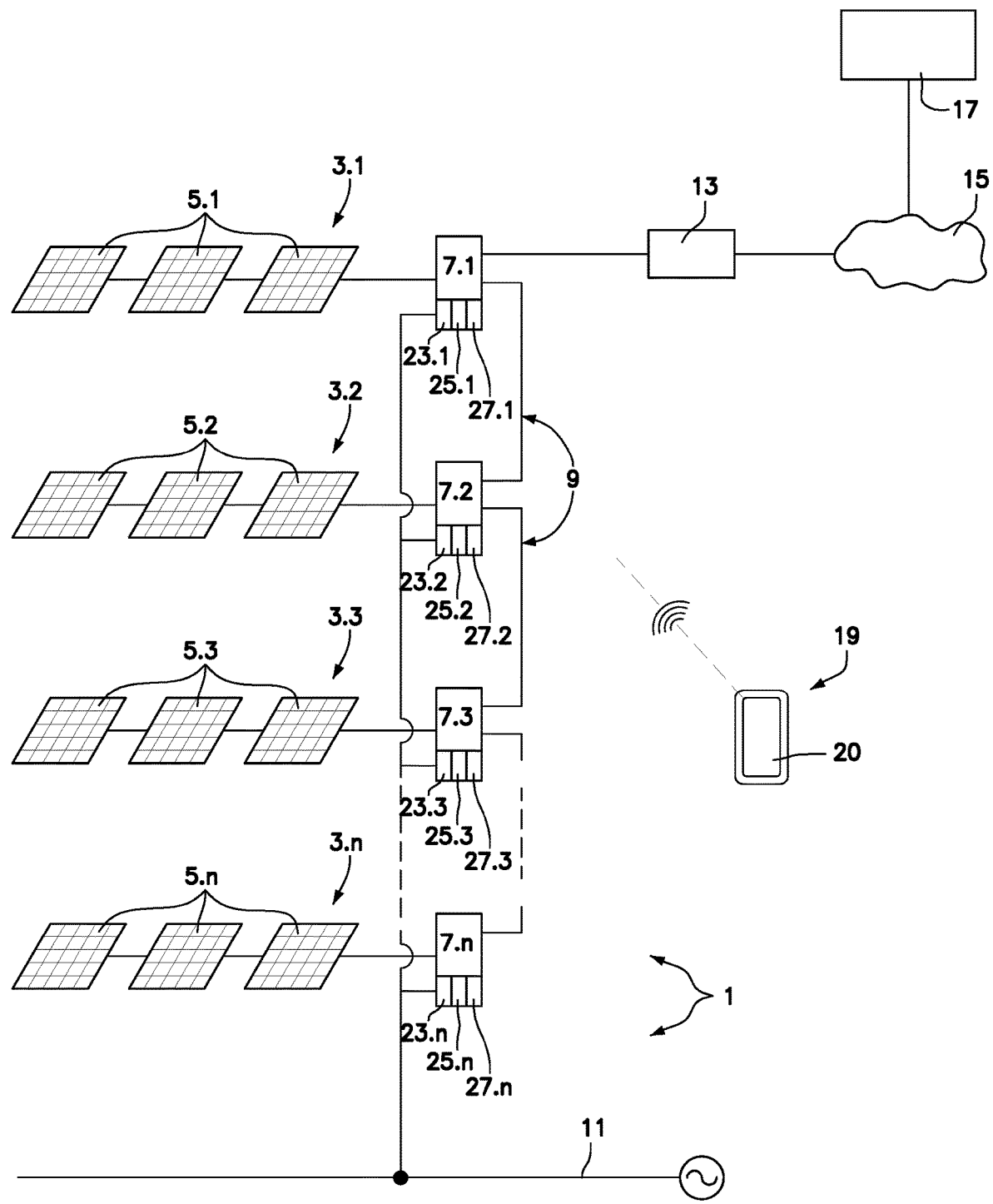
FIG. 1 shows a schematic of a cluster of inverters in a solar photovoltaic plant.

FIG. 1 shows a schematic of a photovoltaic solar plant or system 1 including a plurality of arrays 3.1, 3.2, ... 3.$n$ of photovoltaic panels 5.1, 5.2, ... 5.$n$. Each array of photovoltaic panels further comprises an inverter 7.1, 7.2, ... 7.$n$. The inverters are connected to one another by a local network, for instance a wired network such as an ethernet-based local network 9, which may be configured according to a daisy-chain, ring, star or other topology. In other embodiments a wireless network can be provided.

The inverters 7.$i$ represent nodes of the network. The term "node" as used herein may therefore refer to an inverter or to another electronic device forming part of a network. A generic electronic device representing a node of the network will be referred to with reference 7.$i$, where i=1, 2, ... n, and n is the total number of nodes. As will become apparent from the following description, some of the nodes 7.$i$ will be chosen to perform special functions within the method of the present disclosure. These special nodes will be referred to with a different reference number and, as will become apparent later on, may change over time.

In the exemplary embodiment of a photovoltaic solar plant, the inverters 7.$i$ are electrically connected to an electric power distribution grid 11. The inverters. 7.$i$ collect DC electric energy generated by the photovoltaic panels 5.$i$ and convert the DC electric energy in AC electric energy at suitable voltage, phase and frequency, for distribution on the electric power distribution grid 11. The power distribution grid 11 can be a public power distribution grid. In some embodiments, a local power distribution grid can be provided, instead of or in combination with a public power distribution grid, to power local loads.

Nodes, i.e. inverters 7.$i$ or other electronic devices may be grouped to form a cluster. As used herein, the term "cluster" usually refers to a plurality of nodes, each formed by or including an electronic device such as an inverter 7.$i$, which are in mutual data exchange relationship and which exchange information via multicast messages on the network. In some situations, one or more nodes belonging to the network may be excluded from the cluster, i.e. they may be physically connected to the local network, but not in data exchange relationship with the nodes of the cluster.

In some configurations, devices or nodes of the same local network may be grouped in two or more different clusters. As such, nodes of a cluster communicate with one another through the local network, but do not communicate with the nodes of another cluster connected to the same local network.

In the schematic of FIG. 1 the local network 9 is further connected via a router 13 and via internet 15 to a plant management platform 17.

As will become clear from the following description of features and embodiments of the method according to the present disclosure, a mobile application 20, (shortly mobile app 20) can be installed and run on a mobile device 19, such as a tablet, a laptop computer, a smartphone or the like. The mobile app 20 can be used by an operator for performing several operations on the devices 7.$i$ of the system 1

Each device 7.$i$ embodying a node of the network 9 comprises a storage area 23.$i$ adapted to store data and which may include a protected storage area for storing encryption keys therein. Each device 7.$i$ further includes a data communication unit 25.$i$, adapted to provide for instance an access point function for the purposes which will become apparent later on, as well as a data processing unit 27.$i$, for instance including one or more micro-processors or other processing devices.

When the plant 1 is set up for the first time, an operator may install the photovoltaic arrays 3.$i$ and relevant inverters 7.$i$ along with the various connections and wiring. After commissioning of the inverters 7.$i$, the nodes of the network 9 (or at least some of them) shall be connected to one another to form a cluster of nodes, adapted to communicate to one another in a multicast mode. A group encryption key shall be generated and shared in a secure manner among the nodes belonging to the cluster for the very first time, such that the nodes can initiate multicast communication on the network 9 under secure transmission conditions using the group encryption key to encrypt data bunches. In the present disclosure, this step of the system setup will be referred to as "cluster deploy".

The cluster deploy procedure is performed by the operator using the mobile app 20 running on the mobile device 19. An embodiment of a cluster deploy procedure is summarized in the flow chart of FIG. 2 and is described in detail here below.

In summary, the cluster deploy procedure includes a step of selecting one of the devices 7.$i$ as a key distribution device. The key distribution device generates and distributes a group encryption key GEK to all nodes or devices 7.$i$, which shall be grouped in a cluster. The distribution of the group encryption key GEK shall be performed under secure transmission conditions, such the group encryption key cannot be captured by a non-authorized entity. Once the group encryption key GEK, typically a symmetric encryption key, has been received by all devices 7.$i$ which shall form part of the cluster and is securely stored therein, multicast data communication among the devices 7.1 of the cluster can start, using the group encryption key GEK to provide secure data communication.

As the cluster deploy is the very first procedure required to establish a device cluster, the devices 7.$i$ do not yet belong to any cluster and are not aware on how many and which devices are present in the local network 9.

The first step of the cluster deploy procedure involves selecting one of the devices 7.$i$ as a connecting device, which provides a data communication connection between the selected connecting device and the mobile app 20 running on the mobile device 19. The selected connecting device will be indicated herein with reference 7CD. At this stage all devices 7.$i$, which have been installed, are eligible to become the connecting device 7CD. The selection can be performed in any suitable manner. For instance, the mobile app 20 may select the connecting device 7CD as the device 7.$i$ having the lowest or the highest MAC address, or using any other approach. Typically, the 7CD is the device located nearest to the operator.

As noted above, each device 7.$i$ is provided with a data communication unit 25.$i$, which may feature an access point, identified by its service set identifier SSID. The access point allows establishing a secure communication channel between the selected device 7.$i$ and the mobile app 20. Moreover, each device 7.$i$ may be provided with its own password. The SSID and the password of each device 7.$i$ represent the credentials to establish a secure communication channel between the mobile app 20 running on the mobile device 19 and the device 7.$i$ selected as the connecting device 7CD.

The password of a given device 7.$i$ can be provided to the operator in any suitable manner. In some embodiments, the password of each device 7.$i$ can be stored or printed on a suitable support contained in the package of the device, for instance printed on a leaflet. In other embodiments, the password may be provided by a provider via internet. For instance, the serial number, the MAC address or any other univocal identifier of the selected connecting device 7CD can be used to request the password for connecting the mobile app 20 with the selected connecting device 7CD.

For instance, once the operator has physically installed the inverters 7.$i$ and relevant wiring forming the local network 9, the mobile app 20 can automatically select one of the devices 7.$i$ as the connecting device 7CD. The serial number of the selected connecting device 7CD can be shown on the display of the mobile device 19. The operator can then find the support belonging to the selected connecting device 7CD, on which the password of the connection to the connecting device 7CD is stored. The password is then entered via the mobile app 20 along with the SSID. A secure communication channel, in this embodiment a WiFi channel, is thus established between the mobile app 20 and the selected connecting device 7CD.

Once the secure communication channel has been established between the mobile app 20 and the connecting device 7CD, the operator can inform the connecting device 7CD via the mobile app 20 that a cluster deploy procedure is required.

In an embodiment, as a next step of the cluster deploy procedure, the connecting device 7CD will start a data gathering routine, aimed at gathering data of all the devices 7.$i$ in the network 9. This can be performed using a neighbor-discovery protocol. The resulting gathered information may include, for each device 7.$i$, one or more of the following: the static IP address, the MAC address of the device, the serial number of the device or of a component thereof, the part number, or any other information useful for univocally identifying the device 7.$i$.

The gathered information can be transmitted from the connecting device 7CD to the mobile app 20 and displayed on the mobile device 19. At this stage each device 7.$i$ is not yet connected to a cluster and the operator may select via the mobile app 20 which devices 7.$i$ to include in a cluster, i.e. in a group of devices that will be placed in mutual communication with one another under secure communication conditions. As stated above, the operator may select all the devices 7.$i$, commissioning whereof has been completed and which are connected in the local network 9. Conversely, the operator may select only a subset of said devices 7.$i$ and may decide to leave others unconnected. He may also decide to create two or more different clusters, each including part of the devices 7.1, 7.2, . . . 7.$n$.

All the devices 7.$i$ which are intended to form a cluster shall receive a group encryption key GEK, that shall be generated and distributed to each device of the cluster in a secure manner, preventing unauthorized devices from getting information on the group encryption key GEK.

According to embodiments disclosed herein, the group encryption key is generated and distributed by a key distribution device referred to herein as 7KDD and that can be selected among the devises 7.$i$ intended to be part of the cluster.

As at this stage the cluster has still to be set up, and no device has been elected or designated as the key distribution device, the operator, or the mobile application 20 automatically, can select any one of the devices 7.$i$, which will form part of the cluster, as the key distribution device. The key distribution device will be in charge of generating a group encryption key GEK and distributing said group encryption key to all other devices of the cluster through a secure channel.

In some embodiments, the selected connecting device 7CD can be elected as the key distribution device 7KDD during the cluster deploy procedure. Thus, at this stage 7CD=7KDD. However, the key distribution device may change over time as will be explained later on.

As a next step, the selected key distribution device 7KDD generates a group encryption key GEK. The group encryption key can be generated using any known method. For instance, the group encryption key GEK can be generated as a random number using a random number generator running in the data processing unit 25.$i$ of the selected key distribution device 7KDD. The group encryption key GEK is stored in the storage area of the key distribution device 7KDD. In some embodiments, the time and date at which the group encryption key GEK has been generated is also stored as a time stamp TS, along with the group encryption key itself.

In some embodiments, the selected connecting device 7CD (in the present embodiment and in the procedure described here, the same device which generates the group encryption key GEK) will send a message informing the remaining devices 7.$i$ that a cluster deploy procedure will take place. The message may be a multicast message and will be referred to as a "cluster deploy message". Since the cluster deploy message does not contain any sensitive data, the multicast cluster deploy message can be sent in the clear, i.e. unencrypted.

Conversely, the following steps aimed at distributing the group encryption key GEK generated by the key distribution device 7KDD to the remaining devices 7.$i$ are performed under protected, i.e., secure conditions. Specifically, each device 7.$i$, which is intended to be part of the cluster being set up, shall receive the group encryption key GEK and the transmission shall be performed under secure communication conditions, such that only the authorized devices will receive and store the group encryption key GEK.

For this to be done, a secure transmission channel is established by the key distribution device 7KDD with each authorized device 7.$i$, i.e. with each device which shall become a node of the cluster.

In the present context, a secure transmission channel, or secure communication channel, is understood as a channel that allows exchange of data among two devices, wherein the communication is characterized by the following three features:
(a) Confidentiality: i.e., nobody except the devices involved have access to the information; only the legitimate receiver can read the message transmitted from the sender to the receiver;

(b) Authenticity: i.e., the receiver is ensured about the sender; only the legitimate sender can input a message into the channel;
(c) Integrity: i.e., the receiver is ensured that the information was sent as-is; the received message is the same as the sent message.

In the present disclosure, TLS (transport layer security) is provided as an example of secure transmission, but those skilled in the art of data communication will understand that alternative protocols may be used to establish a secure transmission channel between two devices. Thus, in the present description and claims, reference to a TLS session or channel, shall not be construed as the sole possible secure transmission channel.

According to embodiments, the connecting device 7CD, which in this embodiment is at this stage also the key distribution device 7KDD, starts a handshaking process sequentially with each device 7.i that shall become a node of the cluster. The handshaking process can be aimed at establishing a TLS channel using the public key/private key pair (pubKu, privKu) of the key distribution device 7KDD and of each respective device 7.i, which shall receive the group encryption GEK. The key distribution device 7KDD repeats the handshaking process and secure transmission of the group encryption GEK as many times as there are nodes to be added to the cluster being formed.

In some embodiments, the time stamp TS is transmitted along with the group encryption key GEK from the key distribution device 7KDD to each device to be included in the cluster.

Each node, i.e. each device 7.i that receives the group encryption key GEK will store the group encryption key GEK in a non-volatile section of its storage area. If the time stamp TS is transmitted along with the group encryption key GEK, the receiving node 7.i can further compare the TS with the current time and check if the two data are consistent. The time stamp TS at which the group encryption key GEK has been generated shall be within a given time frame, e.g. about 5 minutes, around the current time. Once the receiving device 7.i has stored the group encryption key GEK and the relevant time stamp TS, it will send an acknowledgement message to the key distribution device 7KDD. If the timestamp of the received group encryption key GEK is inconsistent with the current time, the group encryption key GEK will be discarded.

Once the acknowledgement has been sent to the key distribution device 7KDD, the receiving device 7.i will wait for further instructions.

The above described procedure is repeated for all devices 7.i which have to be included in the cluster. Once the key distribution device 7KDD has received a number of acknowledgements corresponding to the number of devices of the cluster minus one, the key distribution device 7KDD will send a multicast message informing the mobile app 20 and the devices of the cluster that the secure multicast channel has been established. The multicast message is encrypted with the group encryption key, and thus can be decrypted by all devices 7.i of the cluster using the just received group encryption key GEK. Devices not belonging to the cluster have no access to the communication channel, since they can neither decrypt data packages exchanged, nor can they transmit data packages to the devices of the cluster, since they are not in possession of the group encryption key GEK.

The mobile app 20 will finally authorize the connecting device 7CD to send a multicast message informing the devices 7.i of the cluster that the cluster deploy is completed, and can disconnect. In some embodiments, an ID of the mobile app 20 can be stored in the key distribution device 7KDD, to facilitate a new subsequent connection, as the mobile app is recognized as a trusted entity. Other mutual authentication procedures can be used instead.

Figure 2:
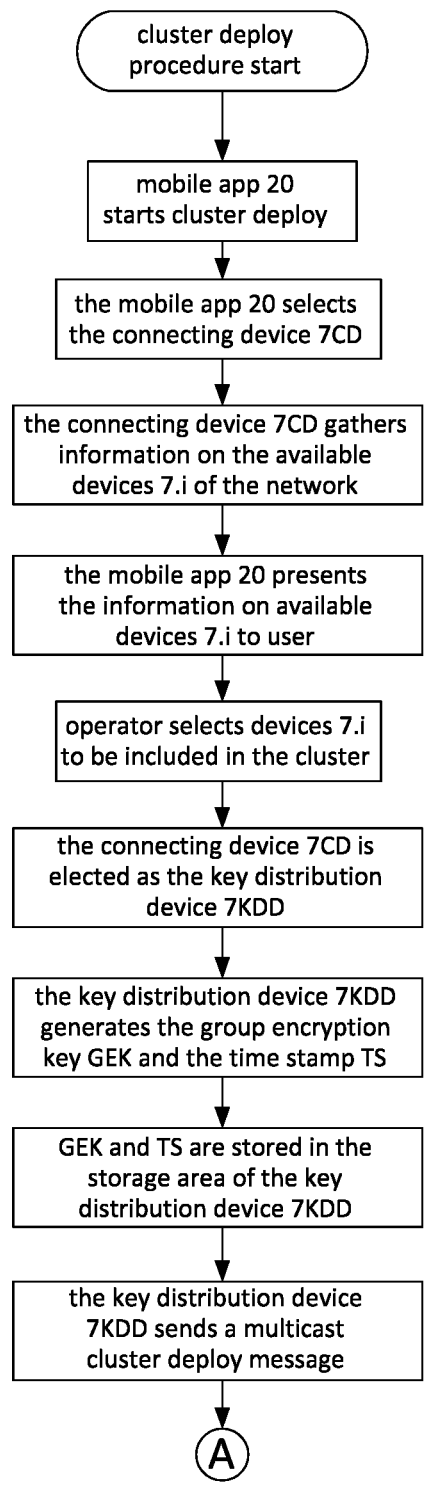
FIGS. 2 to 7 show flow charts illustrating the method of the present disclosure.

The above described procedure is summarized in the flow chart of FIG. 2.

Upon completion of the cluster deploy procedure, All devices of the cluster can communicate to one another under secure conditions, since each device can encrypt any data package using the group encryption key GEK, which has been distributed by the key distribution device 7KDD. Each device 7.i of the cluster can send a multicast message to all devices of the cluster using the group encryption key GEK to encrypt the message. Each device receiving the message can decrypt the message using the same group encryption key which it has previously stored in the non-volatile storage area. Unauthorized devices receiving the multicast message will not be able to read the message, since they are not in possession of the group encryption key GEK and thus cannot decrypt the message.

Once the cluster has been deployed as described above, each device 7.i can periodically transmit a multicast alive message. For instance, a cluster alive multicast message can be transmitted every second from each device 7.i to the other devices of the cluster. Each device may have a timeout counter. The timeout counter is updated (i.e. set to zero) each time a cluster alive message is received by the respective device 7.i. Various events may cause a device to go down and to stop transmitting and receiving messages. For instance, a device can be broken, or may become disconnected.

The main purpose of the cluster alive checking routine is to check if the key distribution device is alive. If the selected key distribution device 7KDD becomes unavailable, a new key distribution device 7KDD must be selected among the remaining devices 7.i. Specifically, if no cluster alive message from the selected key distribution device 7KDD is received by the remaining devices 7.i of the cluster for a time longer than a pre-set time interval (timeout), a new key distribution device 7KDD is selected among the remaining devices.

According to embodiments, when the devices 7.i of the cluster do not receive a cluster alive message from the selected key distribution device 7KDD for a pre-set period of time (timeout), the devices 7.i may start a key distribution device selection routine, to select another device 7.i of the cluster as the key distribution device 7KDD. The selection may be performed according to any suitable criterion. For instance, a univocal feature of the devices, which can be identified instantaneously, can be used as a parameter for the selection of a new key distribution device 7KDD. Among others, the MAC address, the serial number or any other univocal parameter can be used. For example, the key distribution device 7KDD can be selected among the devices 7.i of the cluster as the device having the lowest (or the highest) serial number, or else the lowest (or the highest) MAC address, among the still alive devices 7.i.

The criterion used for the selection of the new key distribution device 7KDD can be used also to solve potential conflicts among two key distribution devices 7KDD which may appear in the cluster. For instance, if the previous key distribution device 7KDD, which has become temporarily unavailable and which has been replaced by a new key distribution device 7KDD with the above described routine, comes up again, the conflict among the two 7KDD is solved by maintaining as the key distribution device the one which has the lower (or the higher) serial number, or else the lower (or the higher) MAC address.

The timeout may be a multiple of the time interval between two consecutive cluster alive multicast messages. For instance, the timeout period may be 3 seconds.

Figure 3:
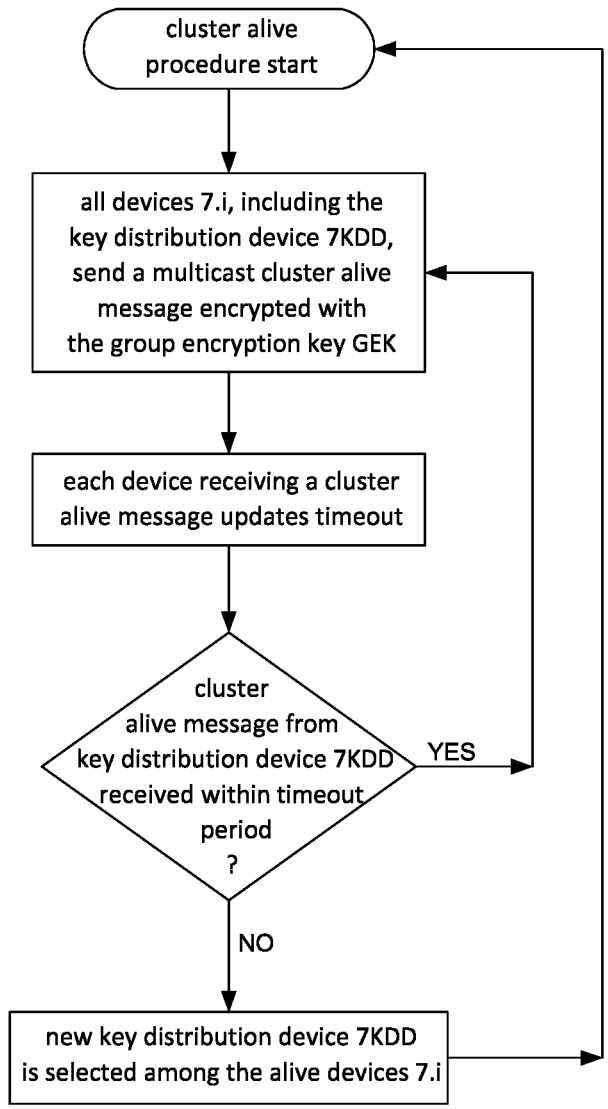

FIG. 3 summarizes the above described cluster alive procedure.

Once a cluster of devices has been setup through the above described cluster deploy procedure, one or more devices can be joined to the cluster, removed from the cluster or replaced. Possible procedures for performing a device join, removal or replacement will be described here after.

Figure 4:
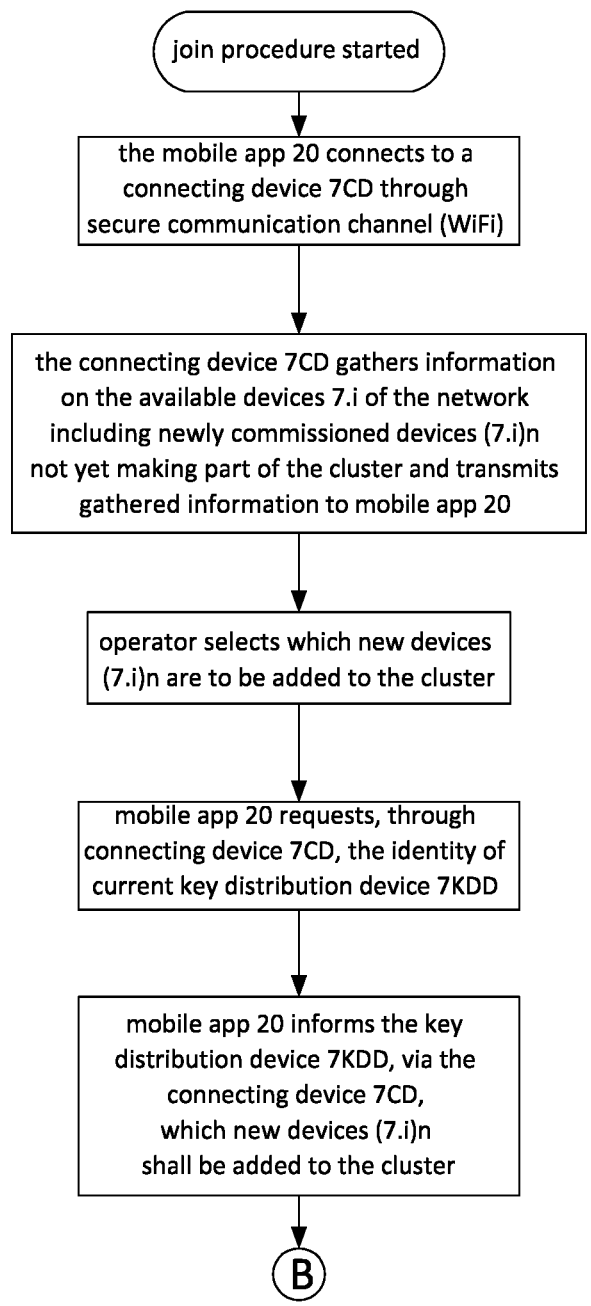

In some situations, addition of a new device 7.*i* to the cluster may be required. For instance, the owner of the network may decide to expand the network by adding nodes, i.e. inverters 7.*i* and relevant photovoltaic arrays 3.*i*. Joining of a new device may also be required, for instance, if a faulty device is to be replaced. Joining of devices to the cluster is performed using a join procedure described below and summarized in the flow chart of FIG. 4, which is performed using the mobile device 19 and the mobile app 20.

Once the one or more new devices have been physically connected to the network 9 and commissioning thereof has been completed, the new devices shall receive the current group encryption key GEK to be able to transmit and receive data under secure communication conditions with the other devices of the cluster.

Here below it is assumed that a plurality of new devices shall be added to the cluster. The new devices are indicated as devices (7.*i*)n.

As a preliminary step, the mobile app 20 may provide to each new device (7.*i*)n to be added to the cluster, a list of revoked certifications and/or a list of blacklisted devices, which contains a list of the MAC addresses of devices 7.*i* of the cluster, which may be compromised. The identity of compromised devices may be discovered in any known manner, for instance through an Intrusion Detection System. In other embodiments, loading of the list of revoked certifications or other information on compromised or banned devices can be provided after the join procedure has been completed, i.e. after the new devices have been added to the cluster.

The aim of loading the list of revoked certifications or other means of identifying banned devices is to prevent the new devices from establishing a communication with a banned device in the cluster, if one is present.

In some embodiments, the communication between mobile app 20 and each new device (7.*i*)n to be added to the cluster can be made using a secure communication channel, e.g. establishing a WiFi connection between the mobile app 20 and each new device (7.*i*)n. As noted above, each device includes a data communication unit which features an access point. Through the access point of each new device (7.*i*)n the mobile app 20 establishes a WiFi connection using the password associated with the relevant device (7.*i*)n.

In other embodiments, this step may be omitted, or the list of revoked certifications or other means of identifying banned devices can be provided to the new device in a different manner.

To provide the current group encryption key GEK to the newly added devices (7.*i*)n, a join procedure, similar to the cluster deploy procedure, is performed.

As an initial step, the mobile app 20 connects to one of the devices 7.*i* of the cluster, namely to a selected connecting device 7CD. The connecting device 7CD can be selected automatically by the mobile app 20, as mentioned above in relation to the cluster deploy procedure. As in the previous described cluster deploy procedure, also in the join procedure the connecting device 7CD provides a connection between the mobile app 20 on the one hand, and the remaining devices 7.*i* connected to the local network 9 on the other.

In some embodiments, as a next step the connecting device 7CD can gather information on the devices 7.*i* connected to the network, similarly to what has been described with respect to the cluster deploy procedure, such that a list of all devices can be shown on the mobile device 19. Each device can be either already connected to the cluster, or still waiting to be included in the cluster. For instance, the new devices (7.*i*)n are still not included in the cluster. The operator can select which of the devices appearing in the list, and not yet forming part of the cluster, shall be added to the cluster with the following procedure.

In other embodiments, this step may be omitted and the operator will only have a choice of connecting all the new devices (7.*i*)n to the cluster.

When the join procedure is started, one of the devices 7.*i* of the cluster is acting as the key distribution device 7KDD. As noted above, the key distribution device 7KDD can be the same device which has been selected as the connecting device 7CD during the cluster deploy procedure. This, however, will often not be the case, since the selected key distribution device may change over time, e.g., if the current key distribution device 7KDD becomes inactive and a new key distribution device 7KDD is selected among the still alive devices 7.*i* of the cluster.

In general, when the join procedure is launched, the current key distribution device 7KDD will be unknown to the mobile app 20. Thus, the mobile app 20 will ask the connecting node 7CD to identify the current key distribution device 7KDD.

The identity of the key distribution device 7KDD is known to all devices 7.*i* of the cluster, and therefore also to the selected connecting device 7CD. This latter communicates the identity of the current key distribution device 7KDD to the mobile app 20. The identity can be defined by the IP address, the MAC address, the serial number or any other unique identifying feature, adapted to univocally identify the key distribution device 7KDD.

Once the mobile app 20 has identified the current key distribution device 7KDD, the operator uses the mobile app 20 to inform the key distribution device 7KDD, through the connecting node 7CD, about which of the new devices (7.*i*)n shall be included in the cluster, i.e. which of said devices shall receive the current group encryption key GEK. This gives the operator the choice to decide whether all newly added and commissioned devices (7.*i*)n shall be included in the cluster or only some of them. Through the mobile app 20 the operator can further instruct the key distribution device 7KDD, via the connecting node 7CD, to provide the current group encryption key GEK to the new devices (7.*i*)n, which shall be added to the cluster. This task can be performed, for instance, using the public and private encryption key pairs of the mobile app 20 and of the current key distribution device 7KDD. The mobile app 20 can generate an instruction message for the key distribution device 7KDD using the private encryption key of the mobile app 20 and the public encryption key of the key distribution device 7KDD. The message can be decrypted only by the key distribution device 7KDD. The message is transmitted by the mobile app 20 to the connecting node 7CD and this latter can multicast the message to all devices of the cluster. Only the key distribution device 7KDD will be able to decrypt the message and perform the instructions contained therein.

Upon receipt of the message, the key distribution device 7KDD may distribute the group encryption key GEK to the new devices (7.i)n, according to instructions received from the mobile application 20 via the connecting device 7CD. The distribution of the group encryption key GEK shall be made through a secure transmission channel.

For this purpose, similarly to what has been described in connection with the cluster deploy procedure, the key distribution device 7KDD initiates a secure communication session with each new device (7.i)n to be joined to the cluster. According to some embodiments, this can be done using the public and private key pairs of each one of said new devices and of the key distribution device 7KDD. For instance, a respective TLS session can be established between the key distribution device 7KDD and each new device (7.i)n to be joined to the cluster The TLS session is used to transmit the current group encryption key GEK and possibly the respective time stamp TS to each new device (7.i)n to be joined to the cluster. The group encryption key GEK and the time stamp TS are stored by each new device in a respective non-volatile storage area. Each new device receiving and storing the group encryption key GEK and time stamp TS informs the key distribution device 7KDD that the group encryption key GEK and the time stamp TS have been received and stored. The key distribution device 7KDD checks if all new devices (7.i)n have sent a message confirming receipt and storage of the group encryption key GEK and relevant time stamp TS and, when the procedure has been completed and all confirmations have been received, informs the mobile app 20 via the connecting device 7CD, accordingly. The mobile app 20 informs the operator that the cluster extension (join) procedure has been completed.

At the end of this cluster extension procedure, the newly added devices (7.i)n have received the current group encryption key GEK and can, therefore, start communicating via multicast messages with the other devices of the cluster connected to the network 9 using the symmetric group encryption key GEK for secure transmission.

In some embodiments, a certification revocation list can be transmitted by the mobile app 20 to each non-compromised device of the cluster at this stage. This can be achieved using individual messages, each message being intended for a respective one of the non-compromised, i.e., non-revoked device 7.i.

For instance, the mobile app 20 can generate a message using its own public and private encryption key pair and the public encryption key of the respective device 7.i which shall receive the certification revocation list, or any other information identifying the compromised devices. The message is sent by the mobile app 20 to the connecting node 7CD. This latter can send each message as a multicast message to all devices of the cluster. Only the intended addressee will be able to decrypt the message using its own private encryption key.

Alternatively, if the current key distribution device 7KDD is a non-compromised device, the task can be transferred from the mobile app 20 to the key distribution device 7KDD, which can be then in charge of transferring individual (unicast) messages to each non-compromised device of the cluster, containing the list of revoked certifications or other information adapted to inform the non-compromised devices about the presence and identity of compromised device within the cluster.

While a need exists to add devices to an existing cluster, e.g., to replace faulty devices and/or to expand the cluster, in other situations the need may arise to remove a device from the cluster. This may happen for instance if the operator wishes to reduce the number of devices of the cluster, if a device is faulty, if a device is compromised or for whatever other reason.

A device can be removed from the cluster virtually or physically. If the device is removed virtually from the cluster, it can remain physically where it was installed, but will cease communicating with the remaining devices of the cluster.

According to embodiments of the method disclosed herein, a so called "leave procedure" is provided to at least virtually remove a device from the cluster. The leave procedure is summarized in the flow charts of FIGS. 5 and 6. The leave procedure is a removing procedure, for at least virtually removing one or more devices from a cluster.

Let's first consider a situation where a device of the cluster is compromised and shall be virtually removed from the cluster. The presence of a compromised device can be detected by an Intrusion Detection System and notified to a central web service, for instance to the plant management platform 17.

The compromised device can be identified by its MAC address, for instance. The procedure described below is aimed at evicting the compromised devices by establishing a new group encryption key through a "rekeying procedure". The new group encryption key generated and distributed during a leave procedure is referred herein as (GEK)new. The new group encryption key (GEK)new will be distributed to the non-compromised devices only and not to the compromised devices. The new group encryption key (GEK)new will be used for future communications among non-compromised devices of the cluster. Since the compromised devices will not receive the new group encryption key (GEK)ne, they will be excluded from further communications, i.e. they will be evicted from the cluster.

As a result, compromised devices (7.i)rev will be virtually removed from the cluster. They can remain physically in their position, do not require to be removed, but will neither provide information to the remaining devices of the cluster, nor receive information therefrom.

According to some embodiments, the non-compromised devices can be informed about the presence of compromised devices (7.i)rev in the cluster, and which shall be evicted, i.e. virtually removed.

Information on the compromised devices (7.i)rev, including an identification feature, such as the IP, MAC address, or serial number thereof, can be communicated by the mobile app 20 to each non-compromised device of the cluster, for instance as described above in connection with the join procedure.

In other embodiments, if the network 9 is connected, e.g. via internet, to a remote control center 17, the information on compromised devices (7.i)rev can be communicated directly by the center 17 to each non-compromised device 7.i. If the information on compromised devices (7.i)rev is given by the mobile app 20, this latter can connect with a connecting device 7CD as described previously. Once connected to the connecting device 7CD, the mobile app 20 can inform through the connecting device 7CD each non-compromised device 7.i about which device of the cluster is compromised and shall therefore be evicted. For instance, each device 7.i may receive from the mobile app 20 a list of MAC addresses of compromised devices and/or a Certification Revocation List CRL, which will be stored in the respective storage area.

As described above, the mobile app 20 can inform each non-compromised device about the list of compromised devices using a message which is intended for each individual non-compromised device only, using the respective private/public encryption keys.

Figure 5:
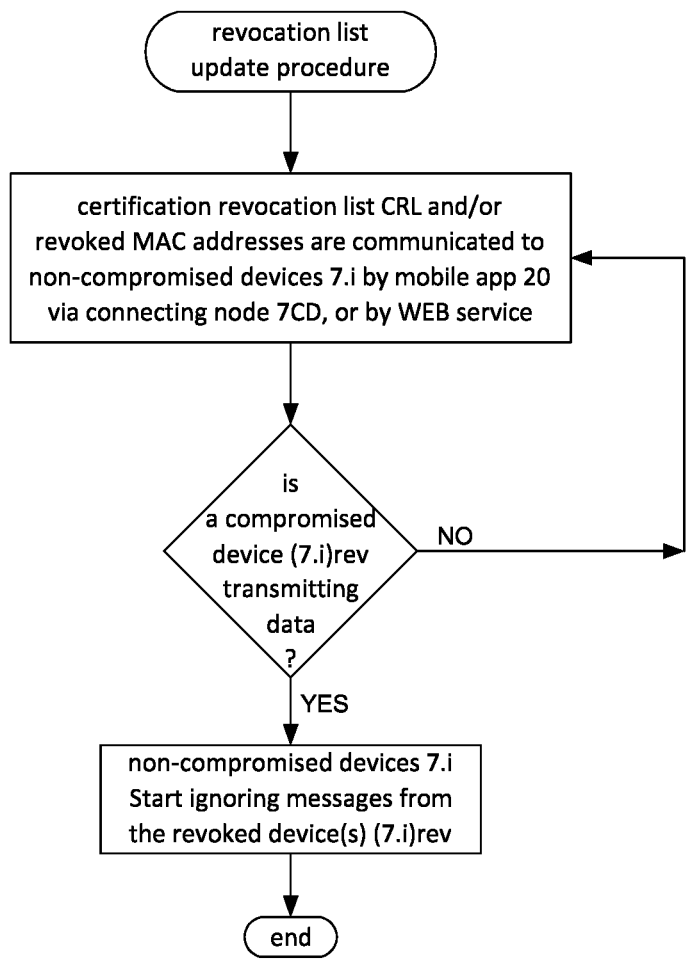

FIG. 5 shows a flow chart which summarizes the procedure updating the list of revoked devices.

If the current key distribution device 7KDD is a compromised device, the non-compromised devices will be informed by the mobile app 20 accordingly. The non-compromised devices 7.i of the cluster will then ignore the messages from the compromised key distribution device 7KDD and will initiate a routine to select a new key distribution device as described above in case of unavailability of the current key distribution device 7KDD.

Whatever means is used to inform the non-compromised devices about the identity of compromised devices in the cluster, the information is not transmitted to the compromised devices (7.i)rev, such that these latter do not become aware that they have been discovered.

Irrespective of the method used to update the list of compromised devices or revoked certifications, once a non-compromised device has been informed that one or some of the devices of the cluster it belongs to are compromised, the non-compromised device will start ignoring messages generated by the compromised device(s) (7.i)rev.

Figure 6:
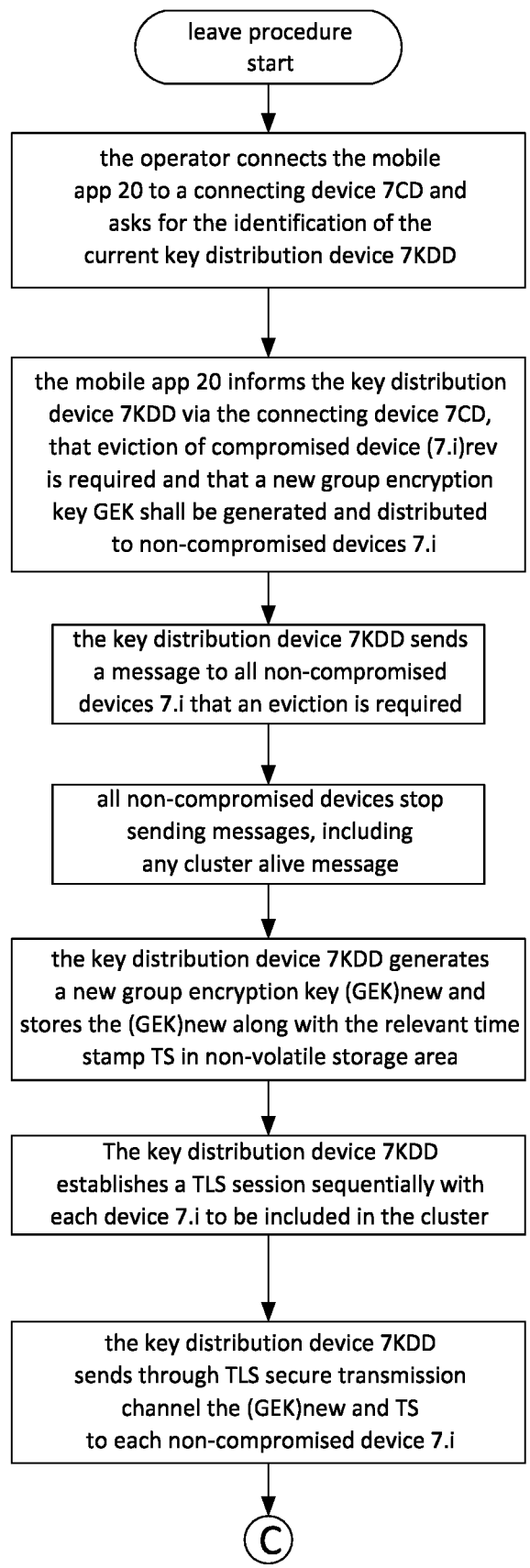

To achieve virtual removal of the compromised devices (7.i)rev, the leave procedure or eviction procedure summarized in the flow chart of FIG. 6 can be used. This procedure can be performed sequentially with the previously described update procedure of the revocation list. Alternatively, the leave procedure can be performed later. Moreover, the leave procedure can be controlled by an operator from a remote center, if the network 9 is connected to such remote center, e.g. center 17. Alternatively, and mandatorily if the network 9 is not connected to a remote center, the leave procedure is performed by an operator using the mobile device 19 and the mobile app 20. The procedure summarized in FIG. 6 is performed via mobile app 20.

The actual leave procedure, which results in eviction of the compromised devices, that will therefore be virtually removed from the cluster, can start by connecting the mobile app 20 to a connecting device 7CD selected among the non-compromised devices of the cluster. Selection can be made, e.g., in an automatic manner by the mobile app 20 itself.

After connection to the connecting device 7CD, for instance via a WiFi, such that a secure transmission channel is established between the mobile app 20 and the connecting device 7CD, the mobile app 20 asks for the identity of the current key distribution device 7KDD.

Once the mobile app 20 has identified the current key distribution device 7KDD, the mobile app 20 informs the key distribution device 7KDD, via the connecting device 7CD, that eviction of the compromised devices (7.i)rev is needed, requiring generation and distribution of a new group encryption key (GEK)new, i.e. that a rekeying procedure shall start.

In some embodiments, the key distribution device 7KDD sends individual messages to all non-compromised devices 7.i informing said devices that an eviction is required. Individual or unicast messages can be sent through a secure channel, e.g. using public/private asymmetric encryption keys of the key distribution device 7KDD and each single non-compromised device 7.i.

After receiving the eviction request message, the non-compromised devices 7.i stop sending any further multicast message, including any cluster alive message. The non-compromised devices will turn in a waiting status, waiting for a secure transmission session (e.g. a TLS session) to be initiated by the key distribution device 7KDD for distributing a new group encryption key (GEK)new. Since the compromised devices (7.i)rev do not receive any message from the key distribution device 7KDD, they procedure not aware that a leave procedure has initiated.

In some embodiments, the above described preliminary step by which the key distribution device 7KDD informs the non-compromised devices that a leave procedure (rekeying procedure) will start, may be omitted.

After having received a request for rekeying from the mobile app 20, the key distribution device 7KDD generates a new group encryption key (GEK)new, in any suitable manner, e.g. using a random number generator, as already described above in connection with the cluster deploy procedure. The new group encryption key (GEK)new and the relevant timestamp TS are stored in a non-volatile storage area of the key distribution device 7KDD.

Next, the key distribution device 7KDD transmits through a secure communication channel the new group encryption key (GEK)new to each non-compromised devices 7.i. This can be done using the private/public asymmetric encryption keys of the key distribution device 7KDD and of each non-compromised device 7.i of the cluster.

For instance, the key distribution device 7KDD can initiate a series of TLS sessions (or any other secure communication session), one with each non-compromised device 7.i, to transmit the new group encryption key (GEK) new and respective timestamp TS to each non-compromised device 7.i.

Each receiving device 7.i stores the new group encryption key (GEK)new and the timestamp TS. A further check can be performed by each non-compromised device 7.i receiving the new group encryption key (GEK)new on consistency of the timestamp with the current time. Each non-compromised device 7.i which successfully receives and stores the new group encryption key (GEK)new acknowledges the key distribution device 7CDD accordingly. Once all non-compromised devices 7.i have acknowledged safe storage of the new group encryption key (GEK)new, the mobile app 20 is informed accordingly by the key distribution device 7KDD via the connecting device 7CD.

The non-compromised devices 7.i, including the key distribution device 7KDD and the connecting device 7CD can start using the new group encryption key (GEK)new. Use of the new group encryption key (GEK)new can start as soon as the key distribution device 7KDD has received a confirmation that all non-compromised devices have received and stored the new group encryption key (GEK) new and respective timestamp TS.

Alternatively, for the use of the new group encryption key to be started, the mobile app 20 can send, via connecting node 7CD, several unicast messages to all nodes involved (connecting device 7CD, key distribution device 7KDD and non-compromised nodes 7.i) that the rekeying procedure has been completed.

The final result of the described procedure is the following. The compromised nodes (7.i)rev are virtually removed from the cluster, since they are unable to send or receive messages, as they are not in possession of the new group encryption key (GEK)new. The remaining, non-compromised devices will continue to communicate with each other using the new group encryption key (GEK)new. Periodical multicast of the cluster alive message can also re-start at this time.

The same procedure can be used also in case a compromised or faulty device must be physically removed. The device to be physically removed is handled as a compromised device. After eviction, the faulty or compromised device can be also physically removed from the network.

According to some embodiments, in order to achieve higher security and safeguard over time, a refresh procedure can be provided, to change, i.e., to refresh the group encryption key. In some embodiments, the group encryption key can be refreshed with the assistance of an operator through the mobile app 20.

Figure 7:
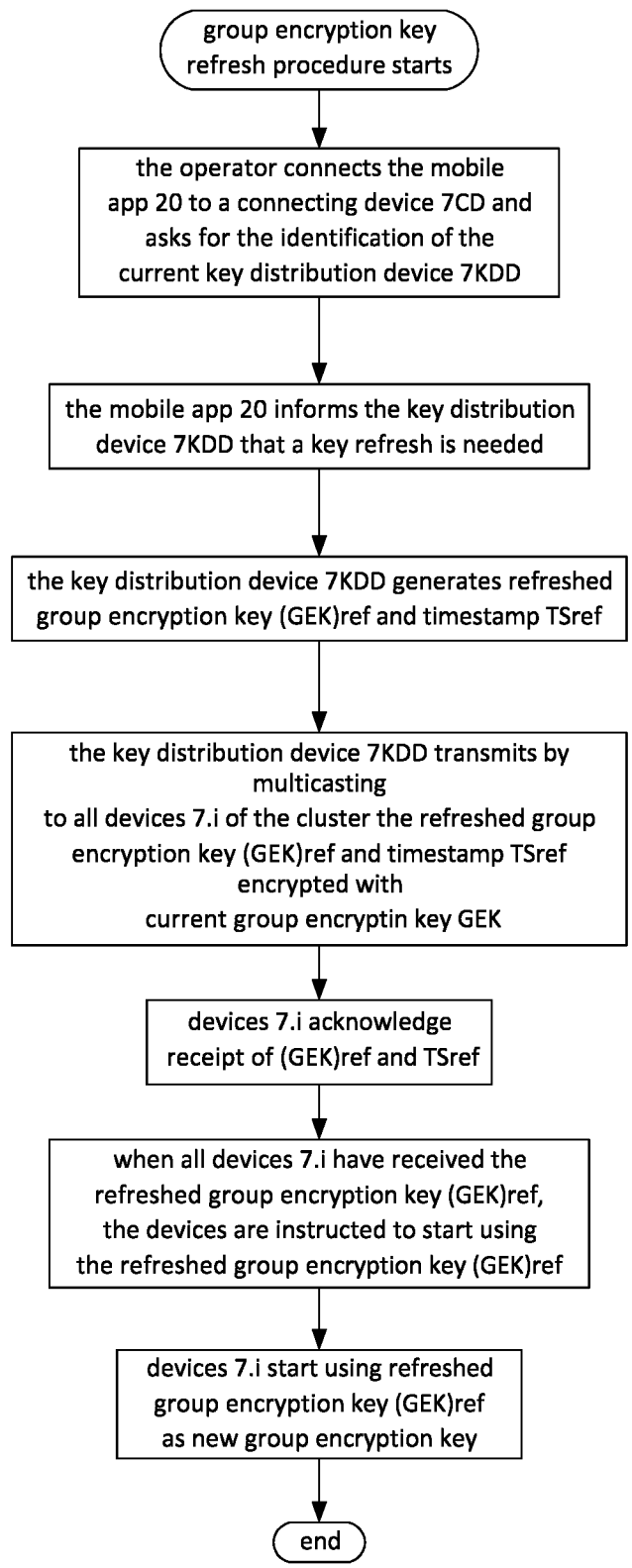

An embodiment of a key refresh procedure is described hereafter and is summarized in the flow chart of FIG. 7

As a first step the mobile app 20 connects to a connecting device 7CD, which can be selected automatically as described above. The connecting device 7CD informs the mobile app 20 about the identity of the current key distribution device 7KDD.

The mobile app connects to the connecting device 7CD and, once connected, the mobile app informs the key distribution device 7KDD via the connecting device 7CD that a group key refresh is required.

Prior to requesting a group key refresh, the mobile app 20 may update the list of revoked certifications or other information localizing the compromised devices, and a leave procedure can be performed, such that the refreshed group encryption key will be distributed only to the non-compromised devices.

Once the request for a group key refresh has been received by the key distribution device 7KDD, this latter generates and stores a refreshed group encryption key (GEK)ref and the datetime or timestamp (TS)ref associated with the refreshed group encryption key. The two data are stored in a non-volatile storage area of the key distribution device 7KDD for transmission to the other devices of the cluster. For this purpose, the key distribution device 7KDD generates an encrypted multicast message containing a refreshed group encryption key, the message being defined as follows:
$\{(GEK)ref, GEK, TS, TSref\}_{GEK}, MAC_{GEK}(\{(GEK)ref, GEK, TS, TSref\}_{GEK})$; wherein
(GEK)ref is the refreshed group encryption key,
TS is the time stamp at which the current group encryption key was generated
TSref is the time stamp at which the refreshed group encryption key was generated
MAC is a HASH function;
$MAC_{GEK}$ means MAC encrypted with the current group encryption key GEK;
the data format { ... }GEK means the content of { ... } encrypted with the current group encryption key GEK.

The above message is transmitted by the key distribution device 7KDD to all the other members of the cluster and the key distribution device 7KDD acknowledges the mobile app 20 via the connecting device 7CD that the message has been sent.

When the above multicast encrypted message is received, each device 7.i of the cluster stores the refreshed group encryption key (GEK)ref and the timestamp TSref associated therewith in the non-volatile storage area thereof. Each device sends an acknowledgement, i.e. a message confirming receipt of the new refreshed group encryption key (GEK)ref and respective timestamp TSref, to the key distribution device 7KDD.

The refreshed group encryption key (GEK)ref is transmitted under secure communication conditions, since the message is encrypted with the current group encryption key GEK; each device can decrypt the message and thus obtain the refreshed group encryption key (GEK)ref and relevant timestamp TSref.

A step can be performed to check if each device has received and stored the refreshed group encryption key (GEK)ref. This can be done, e.g., by the mobile app 20 connecting to each device 7.i of the cluster through the connecting node 7CD and checking whether the refreshed group encryption key (GEK)ref and the timestamp TSref associated therewith have been stored. If this is not the case, a new instance of the key refresh procedure is run using the same, already generated refreshed group encryption key (GEK)ref.

Alternatively, once the key distribution device 7KDD has received a number of acknowledgements corresponding to the number of devices of the cluster minus one, that the refreshed group encryption key (GEK)ref has been received, the key distribution device 7KDD will send a multicast message informing the mobile app 20 and the devices of the cluster that the key refresh procedure has been completed and that therefore the current group encryption key GEK shall be replaced and the refreshed group encryption key (GEK)ref shall be used for further communication.

According to what has been described above, the group encryption key refresh procedure can be started by the operator using the mobile app 20. This implies that the group encryption key is refreshed only when the operator physically connects to the connecting node 7CD of the cluster and starts the group key refresh procedure. The advantage of this approach, is that the mobile app 20 gets knowledge of the refreshed group encryption key (GEK)ref before this latter is adopted by the cluster devices for further communication.

If the cluster is connected via internet to a remote-control center 17, for instance, the group encryption key refresh procedure and distribution procedure of the refreshed group encryption key (GEK)ref can be initiated remotely, by an operator instructing the key distribution device 7KDD via internet. The group encryption key refresh procedure can be substantially the same as described above.

In some embodiments, the group encryption key refresh procedure can be initiated by the key distribution device 7KDD, for instance after a preset period of time has lapsed since the generation and distribution of the current group encryption key GEK, without the intervention of an operator. The procedure for refreshing and distributing the refreshed group encryption key (GEK)ref is the same as described above.

Acknowledgement of correct receipt and storage of (GEK)ref and TSref by the devices 7.i of the cluster is sent by these latter to the key distribution device 7KDD, which sends a multicast message instructing the devices 7.i of the device to replace the current group encryption key GEK with refreshed group encryption key (GEK)ref, once the key distribution device 7KDD has received all the relevant acknowledgements from the other devices 7.i of the cluster.

When the mobile app 20 connects to the cluster via a connecting device 7CD after a key refresh triggered by the key distribution device 7KDD has taken place, the mobile app 20 does not know the current (refreshed) group encryption key (GEK)ref. The mobile app 20 is therefore unable to communicate with the devices of the cluster under secure conditions using the group encryption key. The mobile app 20 is also not aware of which device 7.i is the current key distribution device 7KDD, since (as noted above) the key distribution device 7KDD that was selected at cluster deploy may have changed.

In such case, the procedure for establishing a secure connection between the mobile app 20 and the current key distribution device 7KDD can be as follows. The mobile app 20 establishes a secure communication channel with a selected connecting device 7CD, e.g. via WiFi. The connecting device 7CD can be selected as described above. The mobile app 20 asks the connecting device 7CD about the identity of the current key distribution device 7KDD. The identification data of the current key distribution device 7KDD are transmitted by the connecting device 7CD to the mobile app 20.

The connecting device 7CD has the current (refreshed) group encryption key (GEK)ref stored therein. However, for security reasons, none of the devices 7.i of the cluster, except the key distribution device 7KDD, is allowed to communicate the current group encryption key GEK to other devices. The mobile app 20 can therefore not obtain the current group encryption key (GEK)ref from the connecting device 7CD.

Retrieving the current group encryption key (GEK)ref can be obtain via a secure communication channel established by the mobile app 20 with the current key distribution device 7KDD via the connecting device 7CD. The secure transmission channel can be established using pairs of public and private asymmetric encryption keys of the current key distribution device 7KDD and of the mobile app 20, as well as the relevant certificates.

For instance, the mobile app 20 starts a handshaking procedure with the key distribution device 7KDD to open a secure transmission channel therewith. Since the key distribution device 7KDD can be positioned far away from the location where the mobile device 19 is located, the handshaking process can be executed via the connecting node 7CD.

Upon establishing a secure transmission channel, e.g. a TLS session, the current key distribution device 7KDD can send the current group encryption key to the mobile app 20 through the connecting device 7CD. The current group encryption key may be a refreshed group encryption key (GEK)ref, i.e. a GEK different from the last one known by the mobile app 20, e.g. the group encryption key which was generated and distributed during the cluster deploy procedure, or which may have been communicated to the mobile app 20 during a previous join procedure, or during a group encryption key refresh procedure initiated by the operator through the mobile app 20 (see FIG. 7). Once the current group encryption key has been received by the mobile app 20, this latter can start communicating with the devices of the cluster as described above via the connecting device 7CD.

While the invention has been described in terms of various specific embodiments, it will be apparent to those of ordinary skill in the art that many modifications, changes, and omissions are possible without departing form the spirit and scope of the claims. In addition, unless specified otherwise herein, the order or sequence of any process or method steps may be varied or re-sequenced according to alternative embodiments.

The invention claimed is:

1. A method for secure multicast communication between a plurality of devices forming a cluster of devices electrically connected to an electric power distribution grid for power exchange therewith and further connected to one another by a local network, wherein each device includes a storage area, a data communication unit and a data processing unit, the method comprising:

a) electing one of said devices forming the cluster of devices and further electrically connected to the electric power distribution grid as a key distribution device;

b) generating a group encryption key in said key distribution device;

c) establishing a secure communication channel between the key distribution device and a further device of a group of devices electrically connected to the electric power distribution grid but yet to be connected to the cluster;

d) transmitting the group encryption key from the key distribution device to the further device and storing the group encryption key in the storage area of the further device;

e) repeating steps (c) and (d) for all devices in the group of devices to be connected to the cluster;

f) when all devices of the group of devices to be connected to the cluster have received the group encryption key, starting multicast communication among the devices of the cluster, wherein data packages transmitted by each device of the cluster to the other devices of the cluster are encrypted with the group encryption key.

2. The method of claim 1, wherein the group encryption key is a symmetric encryption key.

3. The method of claim 1, wherein the secure communication channel is adapted to provide confidentiality and integrity of the data transmitted over the secure communication channel, as well as authenticity of the devices between which the secure communication channel has been established.

4. The method of claim 1, wherein the step of establishing a secure communication channel is performed using pairs of public and private keys of the group key distribution device and of the respective further device.

5. The method of claim 1, wherein the devices of the cluster periodically transmit a multicast alive message.

6. The method of claim 1, wherein:

the step of generating a group encryption key further includes the step of generating a time stamp, indicative of the time of generation of the group encryption key; and the time stamp is transmitted along with the group encryption key from the key distribution device to the further devices to be connected to the cluster.

7. The method of claim 6, further comprising:

when a device of the group of devices to be connected to the cluster receives a group encryption key and relevant time stamp, the receiving device compares the time stamp associated with time stamp with the actual time and accepts the group encryption key if the time stamp and the actual time fall within a preset time interval; and otherwise the received group encryption key is discarded.

8. The method of claim 1, further comprising a group encryption key refresh procedure.

9. The method of claim 8, wherein the group encryption key refresh procedure comprises:

the key distribution device generates a refreshed group encryption key;

the refreshed group encryption key is multicasted by the key distribution device to the devices of the cluster.

10. The method of claim 1, further providing a device removing procedure, adapted to remove a sub-group of devices from the cluster.

11. A method for secure multicast communication between a plurality of devices forming a cluster of devices connected to one another by a local network, wherein each device includes a storage area, a data communication unit and a data processing unit, the method comprising:
- a) electing one of said devices as a key distribution device;
- b) generating a group encryption key in said key distribution device;
- c) establishing a secure communication channel between the key distribution device and a further device of a group of devices to be connected to the cluster;
- d) transmitting the group encryption key from the key distribution device to the further device and storing the group encryption key in the storage area of the further device;
- e) repeating steps (c) and (d) for all devices in the group of devices to be connected to the cluster;
- f) when all devices of the group of devices to be connected to the cluster have received the group encryption key, starting multicast communication among the devices of the cluster, wherein data packages transmitted by each device of the cluster to the other devices of the cluster are encrypted with the group encryption key,
- wherein the devices of the cluster periodically transmit a multicast alive message, and
- wherein if the key distribution device fails to transmit a multicast alive message for more than a preset time interval, a different key distribution device is elected among the devices of the cluster.

12. A method for secure multicast communication between a plurality of devices forming a cluster of devices connected to one another by a local network, wherein each device includes a storage area, a data communication unit and a data processing unit, the method comprising:
- a) electing one of said devices as a key distribution device;
- b) generating a group encryption key in said key distribution device;
- c) establishing a secure communication channel between the key distribution device and a further device of a group of devices to be connected to the cluster;
- d) transmitting the group encryption key from the key distribution device to the further device and storing the group encryption key in the storage area of the further device;
- e) repeating steps (c) and (d) for all devices in the group of devices to be connected to the cluster;
- f) when all devices of the group of devices to be connected to the cluster have received the group encryption key, starting multicast communication among the devices of the cluster, wherein data packages transmitted by each device of the cluster to the other devices of the cluster are encrypted with the group encryption key,
- the method further comprising:
- providing a mobile application running on a mobile device;
- selecting one of said devices as a connecting device, which provides a connection between the mobile application and the devices of the network;
- establishing a secure communication channel between the mobile application and the connecting device;
- through the connecting device, gathering information on the devices belonging to the local network; and
- transmitting the information on the devices from the connecting device to the mobile application.

13. The method of claim 12, wherein the step of gathering information on the devices of the network includes gathering information on the number of devices of the network and, for each device belonging to the network, at least one unique identifying feature, adapted to univocally identify said device.

14. The method of claim 13, wherein the unique identifying feature is selected from the group consisting of: IP address, MAC address, serial number, part number of the device or of a component thereof.

15. The method of claim 12, further comprising, once a secure communication channel has been established between the mobile application and the connecting device:
- if a key distribution device has been elected, providing identifying data of the key distribution device to the mobile application; or
- if no key distribution device has been elected, electing the connecting device as the key distribution device.

16. The method of claim 12, further comprising:
- through the mobile application, selecting the group of devices of the local network to be connected to the cluster;
- communicating identification data of said selected devices to the key distribution device, enabling the key distribution device to transmit the group encryption key to the selected devices.

17. The method of claim 12, wherein the step of establishing a secure communication channel between the mobile application and the connecting device comprises:
- establishing a communication channel with a public-private key pair of the communicating device and of the mobile application.

18. The method of claim 12, wherein the step of establishing a secure communication channel between the mobile application and the connecting device comprises:
- establishing a communication channel through a service set identifier and a password between an access point provided by the connecting device and the mobile application.

19. A method for secure multicast communication between a plurality of devices forming a cluster of devices connected to one another by a local network, wherein each device includes a storage area, a data communication unit and a data processing unit, the method comprising:
- a) electing one of said devices as a key distribution device;
- b) generating a group encryption key in said key distribution device;
- c) establishing a secure communication channel between the key distribution device and a further device of a group of devices to be connected to the cluster;
- d) transmitting the group encryption key from the key distribution device to the further device and storing the group encryption key in the storage area of the further device;
- e) repeating steps (c) and (d) for all devices in the group of devices to be connected to the cluster;
- f) when all devices of the group of devices to be connected to the cluster have received the group encryption key, starting multicast communication among the devices of the cluster, wherein data packages transmitted by each device of the cluster to the other devices of the cluster are encrypted with the group encryption key,
- the method further comprising a group encryption key refresh procedure, wherein the group encryption key refresh procedure comprises:
- the key distribution device generates a refreshed group encryption key;

the refreshed group encryption key is multicasted by the key distribution device to the devices of the cluster, and wherein the refreshed group encryption key is transmitted to the devices of the cluster in encrypted form using the group encryption key.

20. A method for secure multicast communication between a plurality of devices forming a cluster of devices connected to one another by a local network, wherein each device includes a storage area, a data communication unit and a data processing unit, the method comprising:
   a) electing one of said devices as a key distribution device;
   b) generating a group encryption key in said key distribution device;
   c) establishing a secure communication channel between the key distribution device and a further device of a group of devices to be connected to the cluster;
   d) transmitting the group encryption key from the key distribution device to the further device and storing the group encryption key in the storage area of the further device;
   e) repeating steps (c) and (d) for all devices in the group of devices to be connected to the cluster;
   f) when all devices of the group of devices to be connected to the cluster have received the group encryption key, starting multicast communication among the devices of the cluster, wherein data packages transmitted by each device of the cluster to the other devices of the cluster are encrypted with the group encryption key, wherein the method further comprises a device removing procedure, adapted to remove a sub-group of devices from the cluster, the device removing procedure comprising:

generating a new group encryption key at the key distribution device;

sequentially establishing a secure communication channel between the key distribution device and each device of the cluster, except the devices of the sub-group of devices to be removed, and transmitting the new group encryption key to each device except the devices of the sub-group of devices to be removed, through the secure communication channel;

once all devices of the cluster, excluding the devices of the sub-group, have received the new group encryption key, replacing the group encryption key by the new group encryption key and starting use of the new group encryption key to encrypt multicast messages sent by the devices of the cluster.

* * * * *